United States Patent Office 3,165,556
Patented Jan. 12, 1965

3,165,556
PREPARATION OF DIVINYL AND TETRAVINYL ETHERS OF PENTAERYTHRITOL
Norman Shachat, Levittown, and James J. Bagnell, Jr., Philadelphia, Pa., assignors to Rohm & Haas Company, Philadelphia, Pa., a corporation of Delaware
No Drawing. Filed Apr. 21, 1961, Ser. No. 104,511
2 Claims. (Cl. 260—615)

This invention deals with the divinyl and tetravinyl ethers of pentaerythritol, as new compositions of matter, and as the products of a new process for preparing them.

Vinylation processes are well known in which the general modus operandi is to mix a substance to be vinylated with acetylene, an acetylene solvent, a suitable catalyst, and reacting the mixture under appropriate conditions of temperature and pressure. Examples of such processes are the vinylation of alcohols, as by the method disclosed in U.S. Patent 2,969,395, and the vinylation of glycerol, as by the method disclosed in U.S. Patent 2,969,400.

In these and related prior art vinylation processes a critical requirement is the use of an organic solvent for acetylene. It is for this reason that attempts to apply these prior methods to the vinylation of pentaerythritol have failed.

Pentaerythritol is a high melting solid (M.P. 256–265° C.) known to be essentially insoluble in most organic solvents. One of the requirements for a solvent in the vinylation reaction is that it be inert to acetylene at vinylation temperatures (130–200° C.). Another requirement is that the solvent be stable with respect to the base that is employed as a catalyst for the reaction. The problem has been that pentaerythritol is only slightly soluble in organic solvents which meet these two requirements. It has, therefore, hitherto been impossible to vinylate pentaerythritol successfully because of the difficulty in getting sizable quantities of it to go into solution.

We have now discovered that it is possible to solve this problem, with surprising success, by performing the catalytic vinylation of pentaerythritol with the use of an aqueous base as the solvent. An alcoholic base, instead of an aqueous base, may be used also. However, an alcoholic base leads to an undesirable side reaction; namely, formation of the vinyl ether of the alcohol solvent.

Illustratively, at temperature of about 150° C., acetylene was absorbed by the aqueous mixture at such a good rate that, during a period of about five hours and under 200–400 p.s.i.g. acetylene pressure, between 50 and 75% of the pentaerythritol was converted to a distillable liquid mixture of partial vinylation products. (If convenient, greater pressures up to about 2000 p.s.i.g. could be used to good advantage in the practice of this invention.) The mixture of liquid products from this aqueous vinylation was then treated with acetylene and a catalytic amount of base in the conventional manner (i.e. using an organic acetylene solvent) to effect complete vinylation. The final result was a mixture composed of about 70% tetravinyl ether of pentaerythritol, 30% of 2-methyl-5,5-divinyloxymethyl-1,3-dioxane, and less than 1% of the bis-acetal. The tetravinyl ether was readily separated from the mixture by crystallization.

The novelty of using water as a solvent in this reaction will be readily apparent since it is well known that simple monohydric alcohols, such as methanol, n-butanol, isopropanol, etc., do not undergo vinylation in the presence of excessive amounts of water. In fact, the presence of water has always been considered to be deleterious in the vinylation of aliphatic alcohols.

The two-step process of the present invention is admirably suited to being practiced in a continuous operation. Illustratively, a solution of pentaerythritol and a catalytic amount of base in water is saturated with acetylene under pressure at 0°–25° C. in a suitable reactor. The base may suitably be selected from sodium and potassium hydroxides and alkoxides (preferably methoxides). The mixture is then pumped continuously under a pressure sufficient to prevent the formation of a gas phase through a reaction zone which is held at the reaction temperature (130°–200° C.)

After a holding time of from 1 to 20 minutes, the reaction mixture is passed from the reaction zone through a pressure release valve, and any excess acetylene gas which is evolved is recycled. The liquid effluent settles into two layers. The lower aqueous layer is drawn off and directed into the reactor for reuse in the aqueous vinylation stage of the process. The upper layer, which consists of the partial vinylation products, is dried over a suitable drying agent, treated with a catalytic amount of base, saturated with acetylene at a low temperature to maintain a liquid mixture and led to a second reaction zone at 130°–200° C. This second stage of the process is very much like the general procedure described in U.S. Patent 2,969,395. The products of complete vinylation obtained from this second stage are obtained and are purified by such conventional techniques as distillation, crystallization, etc.

Optionally, in the continuous process, an auxiliary, water-miscible, good acetylene solvent may be included in the original reaction mixture to increase the amount of absorbed acetylene which enters into the reaction. Another alternative to the procedure described above is to saturate the pentaerythritol solution with acetylene, and to lead it and an aqueous solution of the catalyst to the reactor in individual streams. Still another option is to introduce all three components, the pentaerythritol, the catalyst and the acetylene individually into the reaction zone as aqueous solutions.

If desired, it is of course unnecessary to proceed through the second stage of the process. If a partially vinylated product, such as the divinyl ether of pentaerythritol, is desired, it can be produced in substantial quantities in this way. This divinyl ether is a highly useful polyfunctional cross-linking agent, and this ready means for its preparation and isolation is a valuable improvement in the art.

It may be stated that all of the polyvinyloxy compounds which are provided by the present invention are useful as cross-linking agents for ion-exchange resins and textiles (cellulose cross-linkers). Typical methods for their preparation will be found in the following examples.

*Example 1*

A solution consisting of 880 parts of $H_2O$, 120 parts of potassium hydroxide and 410 parts of pentaerythritol was placed in a 3-l., mechanically stirred autoclave. The system was pressure tested with nitrogen flushed with nitrogen, and then flushed with acetylene. The reaction mixture was heated at 145°–160° C. for five hours while acetylene was introduced at a pressure of 300–470 lbs./sq. in. The excess acetylene was vented and the crude reaction mixture (1682 parts) which separated neatly into two layers was removed from the reactor. The upper organic layer was separated and the aqueous layer was washed several times with ether. The ether washes were combined with the organic layer and the ether was stripped at atmospheric pressure. Flash distillation of the product mixture to a pot temperature of 159° C. at 0.44 mm. afforded 499 parts of a liquid mixture of partial vinylation products, and 201 parts of a brown glossy solid residue which was partially soluble in water. Redistillation of the liquid distillate afforded 250 parts of a liquid mixture of partial vinylation products, boiling range 65° C./0.15 mm. to 93° C./0.13 mm., $n_D^{25}$ 1.4716 to 1.4781, hydrolyzable aldehyde (hydroxylamine hydrochloride method), 11.9 to 12.9 meq./g., which could not be separated readily by distillation, and 122 parts of the divinyl ether of pentaerythritol, B.P. 99.5°–100.5° C./0.16–0.28 mm. The divinyl ether of pentaerythritol was a colorless crystalline solid which could be recrystallized easily from hydrocarbon solvents such as petroleum ether, cyclohexane, etc., M.P. 63–64° C. The infrared spectrum of the compound showed strong absorption bands at 3520 and 1050 cm.$^{-1}$, which may be ascribed to primary hydroxyl functions, and at 1628, 1614, 1192 and 1082 cm.$^{-1}$, which indicate the presence of vinyl ether groups.

*Analysis.*—Calculated for $C_9H_{16}O_4$: C, 57.43; H, 8.57; vinyl ether, 10.6 meq./g.; hydroxyl number, 596. Found: C, 57.31; H, 8.50; vinyl ether (iodine method), 10.3 meq./g.; hydroxyl number, 613.

A mole of the divinyl ether of pentaerythritol absorbed two moles of hydrogen quantitatively over a catalytic quantity of platinum oxide at room temperature under atmospheric pressure. The product, the diethyl ether of pentaerythritol, had a B.P. 93° C./0.25 mm., $n_D^{25}$ 1.4465 (lit. B.P. 115° C./5 mm.). The di-3,5-dinitrobenzoate ester of the diethyl ether, prepared in the usual manner with 3,5-dinitrobenzoyl chloride, was a colorless crystalline solid, M.P. 123°–125° C.

*Analysis.*—Calculated for $C_{23}H_{24}O_{14}N_4$: C, 47.49; H, 4.17; N, 9.65. Found: C, 47.59; H, 4.20; N, 9.53.

*Example 2*

A mixture of 410 parts of pentaerythritol, 120 parts of potassium hydroxide, and 898 parts of water was treated with acetylene at 150°–158° C. for 14.2 hours as described in Example 1. Flash distillation of the product mixture afforded 395 parts of a solid residue and 413 parts of a colorless distillate which consisted of the partial vinylation products of pentaerythritol. Analyses of the total distillate showed: hydrolyzable aldehyde (hydroxylamine hydrochloride method), 12.2 meq./g.; vinyl ether (iodine method), 10.71; hydroxyl number, 279.

*Example 3*

A mixture of 88 parts of the partial vinylation products of pentaerythritol and 1 part of sodium methoxide was treated with acetylene under 250–475 lbs. sq. in. pressure for five hours at 137°–166° C. in a magnetically stirred reactor. During this period 34 parts of acetylene was absorbed. Flash distillation of the raw product mixture afforded 85 parts of a colorless liquid distillate and 25 parts of a brown solid residue. Analysis of the distillate by means of vapor phase chromatography showed that the mixture contained the tetravinyl ether of pentaerythritol (ca. 70%), 2-methyl-5,5-divinyloxymethyl-1,3-dioxane (ca. 30%) and the bis-acetal,

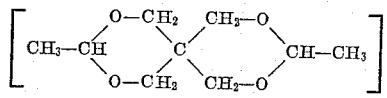

(<1%). On addition of ethanol to the mixture, the tetravinyl ether of pentaerythritol was precipitated. The colorless solid was collected on a filter and recrystallized from ethanol, M.P. 47–49° C. An infrared spectrum of the pure compound exhibited absorption bands at 1634, 1615, 1197 and 1082 cm.$^{-1}$ which are attributable to vinyl ether functions.

*Analysis.*—Calculated for $C_{13}H_{20}O_4$: C, 64.98; H, 8.39; mol. wt., 240.3; hydrolyzable aldehyde, 16.6 meq./g. Found: C, 64.72; H, 8.28; mol. wt. (ebullioscopic in acetone), 251; hydrolyzable aldehyde (hydroxylamine hydrochloride method), 16.5 meq./g.

A mole of the tetravinyl ether cleanly absorbed four moles of hydrogen over a platinum oxide catalyst at room temperature and atmospheric pressure.

As an unequivocal structure proof of the main products of the complete vinylation of pentaerythritol, the following reactions were performed. A mixture of the completely vinylated products of pentaerythritol was examined by infrared spectroscopy and vapor phase chromatography. The infrared spectrum indicated the complete absence of a hydroxyl function and the chromatogram showed the presence of three components, one in approximately 70% (previously shown to be the tetravinyl ether of pentaerythritol), one in approximately 30% and the other in trace amounts.

*Analysis.*—Found: hydrolyzable aldehyde (hydroxylamine hydrochloride method), 13.4 meq./g.; vinyl ether (iodine method), 12.8 meq./g.; hydroxyl number, 25.

The mixture (52.1 parts) was completely hydrogenated over $PtO_2$ (0.5 part) at room temperature and 4–30 lbs./sq. in. pressure. Hydrogen (1.33 parts) was absorbed. The catalyst was removed by filtration and the filtrate was heated under gentle reflux with 200 ml. of 5.0 M hydroxylamine hydrochloride solution for 7.25 hours. The layers were separated and the aqueous layer was washed with ether. The ether solutions were combined with the organic layer and dried over anhydrous sodium sulfate. A vapor phase chromatogram of the dried ether solution showed two product peaks with area ratios of approximately 70:30. The drying agent was removed by filtration and the ether by distillation. The two products (42.3 parts) were separated by distillation under reduced pressure. The tetraethyl ether of pentaerythritol boiled at 63°–65° C. (0.3 mm.) $n_D^{25}$ 1.4196; yield 27.3 parts. The boiling point reported in the literature is 83° C. (5 mm.).

*Analysis.*—Calculated for $C_{13}H_{18}O_4$: C, 62.87; H, 11.36. Found: C, 63.11; H, 11.19.

The infrared spectrum of the liquid was consistent with the assigned structure.

The other colorless liquid product distilled at 92°–94° C. (0.25 mm.); $n_D^{25}$ 1.4465; yield, 11.8 parts. A boiling point of 115° C. (5 mm.) is reported for the diethyl ether of pentaerythritol in the literature.

*Analysis.*—Calculated for $C_9H_{20}O_4$: C, 56.22; H, 10.49. Found: C, 56.57; H, 10.26.

Again, the infrared spectrum was consistent with the assigned structure, exhibiting both strong hydroxyl (3400 and 1050 cm.$^{-1}$) and saturated ether (1090–1130 cm.$^{-1}$) absorption.

We claim:

1. Process for preparing a composition of matter essentially consisting of the divinyl ether of pentaerythritol, comprising, introducing sufficient water into a reaction system containing pentaerythritol and a catalytic quantity of a base from the class consisting of sodium and potassium hydroxides so that the water will dissolve at least some of the pentaerythritol, saturating the aqueous solution of pentaerythritol and base with acetylene under pressure at a temperature of between about 0° and 25° C., introducing said acetylene-saturated mixture into a reaction zone where the vinylation takes place under a pressure of between about 200 and 2000 p.s.i.g. and temperature of between about 130° and 200° C., thereby forming a two-layered system in which the lower is an aqueous layer and the upper layer consists of partial vinylation products including the divinyl ether of pentaerythritol.

2. Process for preparing a composition of matter essentially consisting of the tetravinyl ether of pentaerythritol, comprising, the steps in the process of claim 1 followed by the separation from the lower aqueous layer of the upper layer consisting of partial vinylation products, drying said partial vinylation products, and treating said dried partial vinylation products with a liquid mixture of a catalytic amount of one of the bases identified in claim 1 substantially saturated with acetylene, and introducing the products of that treatment into a reactor together with an organic acetylene solvent where the further vinylation of those products takes place under the same temperature and pressure conditions as in claim 1.

References Cited in the file of this patent

UNITED STATES PATENTS

| | | |
|---|---|---|
| 1,959,927 | Reppe | May 22, 1934 |
| 2,472,084 | Beller et al. | June 7, 1949 |
| 2,969,395 | Nedwick et al. | Jan. 24, 1961 |

OTHER REFERENCES

Nieuwland et al.: The Chemistry of Acetylene (1945), pages 123–125.

Reppe: Acetylene Chemistry, P. B. Report, 18852–S (1949), pp. 30–32.